(12) United States Patent
Ushida et al.

(10) Patent No.: US 11,271,459 B2
(45) Date of Patent: Mar. 8, 2022

(54) ROTOR MANUFACTURING METHOD

(71) Applicant: AISIN CORPORATION, Kariya (JP)

(72) Inventors: Hideharu Ushida, Anjo (JP); Yoshihito Nagai, Anjo (JP)

(73) Assignee: AISIN CORPORATION, Kariya (JP)

( * ) Notice: Subject to any disclaimer, the term of this patent is extended or adjusted under 35 U.S.C. 154(b) by 212 days.

(21) Appl. No.: 16/080,249

(22) PCT Filed: Mar. 28, 2017

(86) PCT No.: PCT/JP2017/012595
§ 371 (c)(1),
(2) Date: Aug. 27, 2018

(87) PCT Pub. No.: WO2017/170523
PCT Pub. Date: Oct. 5, 2017

(65) Prior Publication Data
US 2019/0052155 A1  Feb. 14, 2019

(30) Foreign Application Priority Data

Mar. 28, 2016  (JP) .............................. JP2016-064558

(51) Int. Cl.
*H02K 15/03* (2006.01)
*H02K 15/02* (2006.01)
(Continued)

(52) U.S. Cl.
CPC ......... *H02K 15/03* (2013.01); *B23K 26/0006* (2013.01); *B23K 26/035* (2015.10);
(Continued)

(58) Field of Classification Search
CPC ............ B23K 2101/04; B23K 2101/36; B23K 2103/02; B23K 2103/04; B23K 2103/172;
(Continued)

(56) References Cited

U.S. PATENT DOCUMENTS 3,533,867 A * 10/1970 Van Derzee ........ H01F 41/0233
156/152
4,114,019 A *  9/1978 Sandor ................... B23K 9/025
219/137 R
(Continued)

FOREIGN PATENT DOCUMENTS

CN          1665099 A      9/2005
JP         58224090      * 12/1983
(Continued)

OTHER PUBLICATIONS

Translation JP2012205446 (Year: 2020).*
Jul. 4, 2017 Search Report issued in International Patent Application No. PCT/JP2017/012595.

*Primary Examiner* — Ibrahime A Abraham
*Assistant Examiner* — Frederick F Calvetti
(74) *Attorney, Agent, or Firm* — Oliff PLC

(57) ABSTRACT

A rotor manufacturing method that includes stacking a plurality of electromagnetic steel sheets; and welding the plurality of electromagnetic steel sheets by moving a welding head relative to the plurality of electromagnetic steel sheets that are stacked in a state in which the welding head is inclined at a predetermined angle with respect to a stacking surface of the electromagnetic steel sheets so that a molten portion passes through at least one of the electromagnetic steel sheets.

7 Claims, 9 Drawing Sheets

(51) Int. Cl.
| | |
|---|---|
| *B23K 26/262* | (2014.01) |
| *B23K 26/24* | (2014.01) |
| *B23K 26/26* | (2014.01) |
| *B23K 26/32* | (2014.01) |
| *B23K 26/035* | (2014.01) |
| *B23K 26/21* | (2014.01) |
| *B23K 26/00* | (2014.01) |
| *B23K 26/08* | (2014.01) |
| *H02K 1/276* | (2022.01) |
| *H02K 1/28* | (2006.01) |
| *B23K 101/04* | (2006.01) |
| *B23K 103/04* | (2006.01) |
| *B23K 101/36* | (2006.01) |
| *B23K 103/16* | (2006.01) |
| *B23K 103/02* | (2006.01) |

(52) U.S. Cl.
CPC .......... *B23K 26/0876* (2013.01); *B23K 26/21* (2015.10); *B23K 26/24* (2013.01); *B23K 26/26* (2013.01); *B23K 26/262* (2015.10); *B23K 26/32* (2013.01); *H02K 1/276* (2013.01); *H02K 1/28* (2013.01); *H02K 15/02* (2013.01); *B23K 2101/04* (2018.08); *B23K 2101/36* (2018.08); *B23K 2103/02* (2018.08); *B23K 2103/04* (2018.08); *B23K 2103/172* (2018.08)

(58) Field of Classification Search
CPC .............. B23K 26/0006; B23K 26/035; B23K 26/0876; B23K 26/21; B23K 26/24; B23K 26/26; B23K 26/262; B23K 26/32; B23K 26/082; B23K 26/0869; B23K 26/0884; B23K 26/22; B23K 26/244; H02K 15/02; H02K 15/03; H02K 1/276; H02K 1/28
USPC .................................................... 29/596, 598
See application file for complete search history.

(56) References Cited

U.S. PATENT DOCUMENTS

| | | | | | |
|---|---|---|---|---|---|
| 4,456,812 | A | * | 6/1984 | Neiheisel | B23K 26/0821 219/121.85 |
| 4,468,551 | A | * | 8/1984 | Neiheisel | B23K 26/0846 219/121.6 |
| 4,500,771 | A | * | 2/1985 | Miller | B23K 26/0846 219/121.68 |
| 4,523,076 | A | * | 6/1985 | Laymon | B23K 9/0026 219/125.1 |
| 4,645,547 | A | * | 2/1987 | Krause | H01F 1/14783 148/111 |
| 4,662,708 | A | * | 5/1987 | Bagdal | B23K 26/0823 359/210.1 |
| 5,053,601 | A | * | 10/1991 | Landtwing | B23K 26/0093 219/121.63 |
| 5,437,090 | A | * | 8/1995 | Sakane | H02K 1/243 219/121.14 |
| 5,472,772 | A | * | 12/1995 | Jones | B23K 26/20 219/136 |
| 5,942,831 | A | * | 8/1999 | Yamada | H02K 15/024 310/216.136 |
| 5,955,201 | A | * | 9/1999 | Loudermilk | C23C 22/74 428/450 |
| 6,046,432 | A | * | 4/2000 | Addison | B23K 9/032 219/125.1 |
| 6,249,072 | B1 | * | 6/2001 | Sakagami | H02K 1/146 310/216.004 |
| 6,448,682 | B2 | * | 9/2002 | Sakagami | H02K 1/146 310/216.057 |
| 6,787,942 | B2 | * | 9/2004 | Lilie | H02K 15/02 310/12.01 |
| 6,902,380 | B2 | * | 6/2005 | Ojima | H02K 1/276 417/410.4 |
| 7,595,578 | B2 | * | 9/2009 | Aramaki | H02K 1/148 29/603.01 |
| 7,761,975 | B2 | * | 7/2010 | Rau | H02K 1/16 29/596 |
| 7,965,014 | B2 | * | 6/2011 | Shinagawa | H02K 1/148 310/216.113 |
| 8,079,509 | B2 | * | 12/2011 | Lowney | B23K 3/087 228/262.51 |
| 8,127,418 | B2 | * | 3/2012 | Bertelsen | E04H 7/06 29/281.4 |
| 8,410,657 | B2 | * | 4/2013 | Utaka | H02K 1/16 310/216.136 |
| 8,943,677 | B2 | * | 2/2015 | Gerster | C22C 38/14 29/609 |
| 9,154,005 | B2 | * | 10/2015 | Kitagawa | H02K 15/03 |
| 9,608,485 | B2 | * | 3/2017 | Yamagishi | H02K 1/2766 |
| 10,340,754 | B2 | * | 7/2019 | Ogino | H02K 1/148 |
| 2001/0015589 | A1 | | 8/2001 | Sakagami et al. | |
| 2005/0280328 | A1 | * | 12/2005 | Neet | H02K 3/345 310/214 |
| 2006/0043810 | A1 | * | 3/2006 | Shimizu | H02K 1/278 310/156.08 |
| 2006/0043814 | A1 | * | 3/2006 | Calfo | H02K 1/148 310/216.091 |
| 2007/0188289 | A1 | * | 8/2007 | Kumano | C23C 18/02 336/219 |
| 2007/0222323 | A1 | * | 9/2007 | Neet | H02K 15/10 310/215 |
| 2009/0214890 | A1 | * | 8/2009 | Lowney | B23K 1/008 428/650 |
| 2010/0123462 | A1 | * | 5/2010 | Bittar | G01V 3/28 324/369 |
| 2010/0171388 | A1 | * | 7/2010 | Chen | H02K 15/02 310/216.065 |
| 2013/0278103 | A1 | * | 10/2013 | McPherson | H02K 15/02 310/154.02 |
| 2014/0057414 | A1 | * | 2/2014 | Iyer | B23K 26/38 438/463 |
| 2014/0077652 | A1 | * | 3/2014 | Yamagishi | H02K 1/28 310/156.21 |
| 2014/0202742 | A1 | * | 7/2014 | Jones | B23K 26/355 174/253 |
| 2014/0213042 | A1 | * | 7/2014 | Lei | H01L 21/78 438/462 |
| 2014/0292132 | A1 | * | 10/2014 | Kazmin | H02K 15/03 310/156.01 |
| 2015/0075845 | A1 | * | 3/2015 | Yoo | H05K 3/4647 174/251 |
| 2015/0171674 | A1 | * | 6/2015 | Lee | H02K 1/276 318/724 |
| 2017/0025913 | A1 | * | 1/2017 | Nagahiro | H02K 15/02 |
| 2017/0201163 | A1 | * | 7/2017 | Chung | H02K 1/12 |
| 2017/0310186 | A1 | * | 10/2017 | Wang | H02K 1/16 |
| 2018/0269729 | A1 | * | 9/2018 | Takemoto | H02K 1/146 |
| 2018/0269731 | A1 | * | 9/2018 | Ogino | H02K 15/12 |
| 2020/0067388 | A1 | * | 2/2020 | Zeadan | B23K 26/244 |
| 2020/0335574 | A1 | * | 10/2020 | Seo | B23K 26/20 |

FOREIGN PATENT DOCUMENTS

| | | | |
|---|---|---|---|
| JP | H06-261503 A | | 9/1994 |
| JP | H09-247908 A | | 9/1997 |
| JP | H09247908 | * | 9/1997 |
| JP | 20011231190 | * | 8/2001 |
| JP | 2004-55573 A | | 2/2004 |
| JP | 2012205446 | * | 10/2012 |
| JP | 2015-202027 A | | 11/2015 |
| WO | 99/21264 A1 | | 4/1999 |

* cited by examiner

ROTOR MANUFACTURING METHOD

BACKGROUND

The present disclosure relates to a rotor manufacturing method, and more particularly, to a rotor manufacturing method including a step of welding a plurality of stacked electromagnetic steel sheets.

Hitherto, there is known a rotor manufacturing method including a step of welding a plurality of stacked electromagnetic steel sheets. Such a rotor (core) manufacturing method is disclosed in, for example, Japanese Patent Application Publication No. 2004-55573 (JP 2004-55573 A).

JP 2004-55573 A discloses a stacked core manufacturing method for welding stacked thin sheet cores (stacked cores) by radiating a laser beam from a laser welding apparatus onto the stacked thin sheet cores. In the stacked core manufacturing method, the laser beam is radiated from the laser welding apparatus orthogonally to a stacking direction of the thin sheet cores (along the stacking surface of the thin sheet cores). In the stacked core manufacturing method, the laser radiation of the laser welding apparatus is turned ON when the welding is started for a thin sheet core at the top (start side) out of the stacked thin sheet cores, and is turned OFF when the welding position of the laser welding apparatus reaches the welding end position of a thin sheet core arranged at the tail.

The laser welding apparatus described in JP 2004-55573 A controls the laser radiation for the stacked thin sheet cores only by switching ON/OFF of the laser radiation of the laser welding apparatus. Therefore, laser power of the laser welding apparatus is considered to be constant from the start to the end of welding. The thin sheet core includes a body portion of the thin sheet core (mainly an iron component) and an insulating film that covers the body portion.

SUMMARY

When the stacked thin sheet cores are welded by radiating the laser beam having constant power orthogonally to the stacking direction of the thin sheet cores (along the stacking surface of the thin sheet cores) as in JP 2004-55573 A, however, repetition is alternately caused between a state in which the laser beam is radiated mainly onto the iron component and a state in which the laser beam is radiated mainly onto the insulating film. The insulating film is gasified at a relatively low temperature as compared to the iron component, and it is therefore likely that spatters (scattering) or the like are generated due to splashing of a molten portion (molten iron component and molten insulating film). Thus, there is a problem in that the welding quality of the molten portion is unstable at a part having a large ratio of the insulating film.

An exemplary aspect of the disclosure provides a rotor manufacturing method in which the welding quality of a molten portion can be stabilized.

A rotor manufacturing method according to one aspect of the present disclosure includes stacking a plurality of electromagnetic steel sheets, and welding the plurality of electromagnetic steel sheets by moving a welding head relative to the plurality of electromagnetic steel sheets that are stacked in a state in which the welding head is inclined at a predetermined angle with respect to a stacking surface of the electromagnetic steel sheets so that a molten portion passes through at least one of the electromagnetic steel sheets. The molten portion means a portion of the electromagnetic steel sheet that is melted into liquid by heat. The "stacking surface of the electromagnetic steel sheets" means a face (surface) where adjacent electromagnetic steel sheets out of the electromagnetic steel sheets are stacked. The "inclination of the welding head at the predetermined angle with respect to the stacking surface of the electromagnetic steel sheets" means that the welding head is inclined at the predetermined angle with respect to a plane along the stacking surface of the electromagnetic steel sheets.

As described above, the rotor manufacturing method according to one aspect of the present disclosure includes welding the plurality of electromagnetic steel sheets by moving the welding head relative to the plurality of electromagnetic steel sheets that are stacked in the state in which the welding head is inclined at the predetermined angle with respect to the stacking surface of the electromagnetic steel sheets so that the molten portion passes through at least one of the electromagnetic steel sheets. Thus, during the welding, the molten portion is brought into a state in which an iron component (electromagnetic steel sheet body portion) and an insulating film portion are mixed together, thereby stabilizing the components of the molten portion during the welding. That is, the variation between the ratio of the iron component and the ratio of the insulating film portion is reduced in the molten portion. Thus, spatters (splashing or scattering) due to a relatively large ratio of the insulating film portion are reduced. As a result, the welding quality of the molten portion can be stabilized.

By moving the welding head relative to the plurality of electromagnetic steel sheets that are stacked in the state in which the welding head is inclined, the molten portion gradually moves along the stacking direction of the plurality of stacked electromagnetic steel sheets, thereby reducing an abrupt temperature change on the stacking surface (side surface) of the electromagnetic steel sheets. Thus, deterioration of the welding quality of the molten portion, such as weld cracking, is prevented.

According to the present disclosure, the welding quality of the molten portion can be stabilized as described above.

DETAILED DESCRIPTION OF EMBODIMENTS

Embodiments of the present disclosure are described below with reference to the drawings.

First Embodiment (Structure of Rotating Electrical Machine)

The structure of a rotating electrical machine 100 according to a first embodiment is described with reference to FIG. 1 to FIG. 3.

Figure 1:
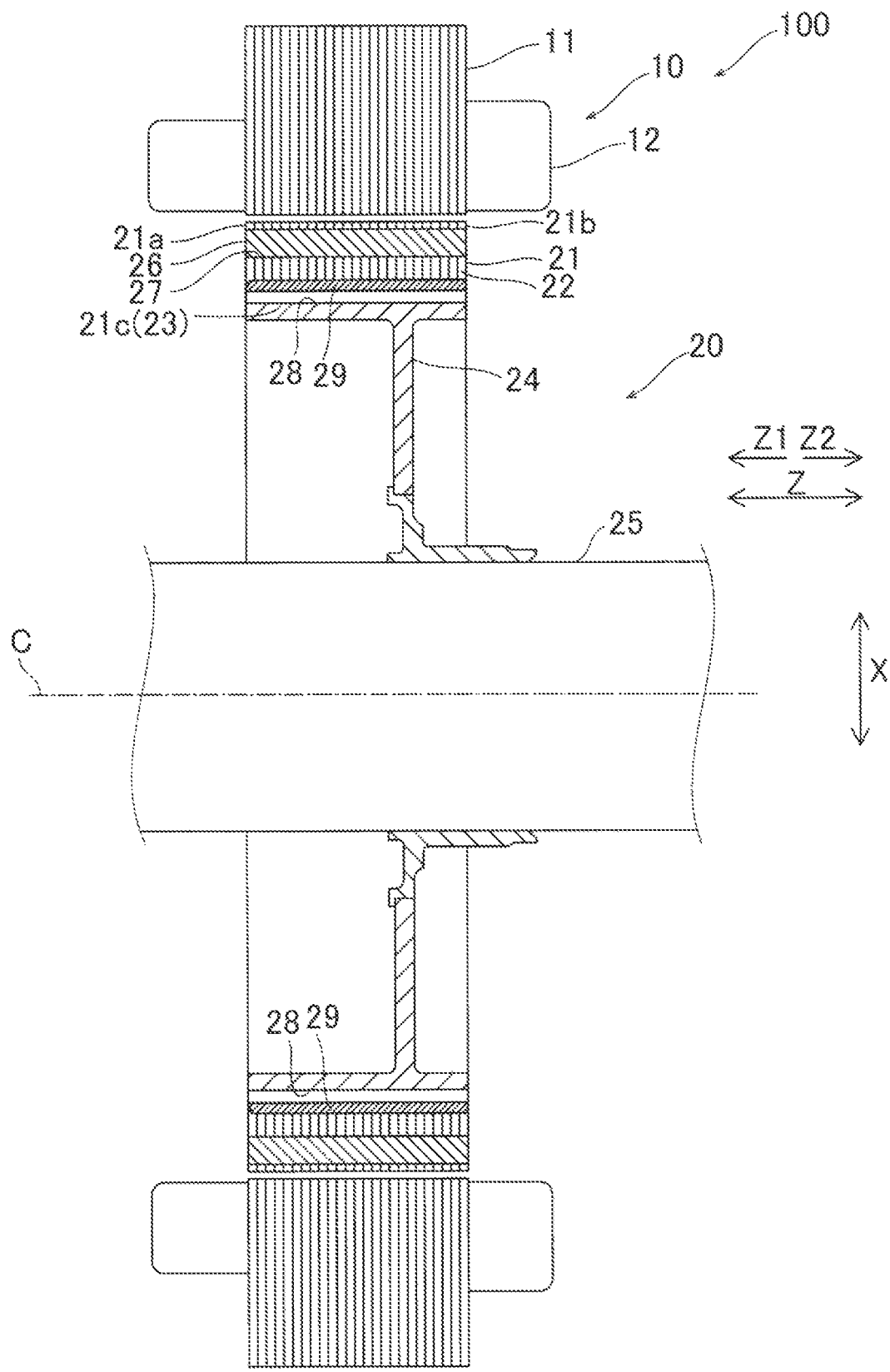
FIG. 1 is a sectional view of a rotating electrical machine according to a first embodiment of the present disclosure.
Figure 2:
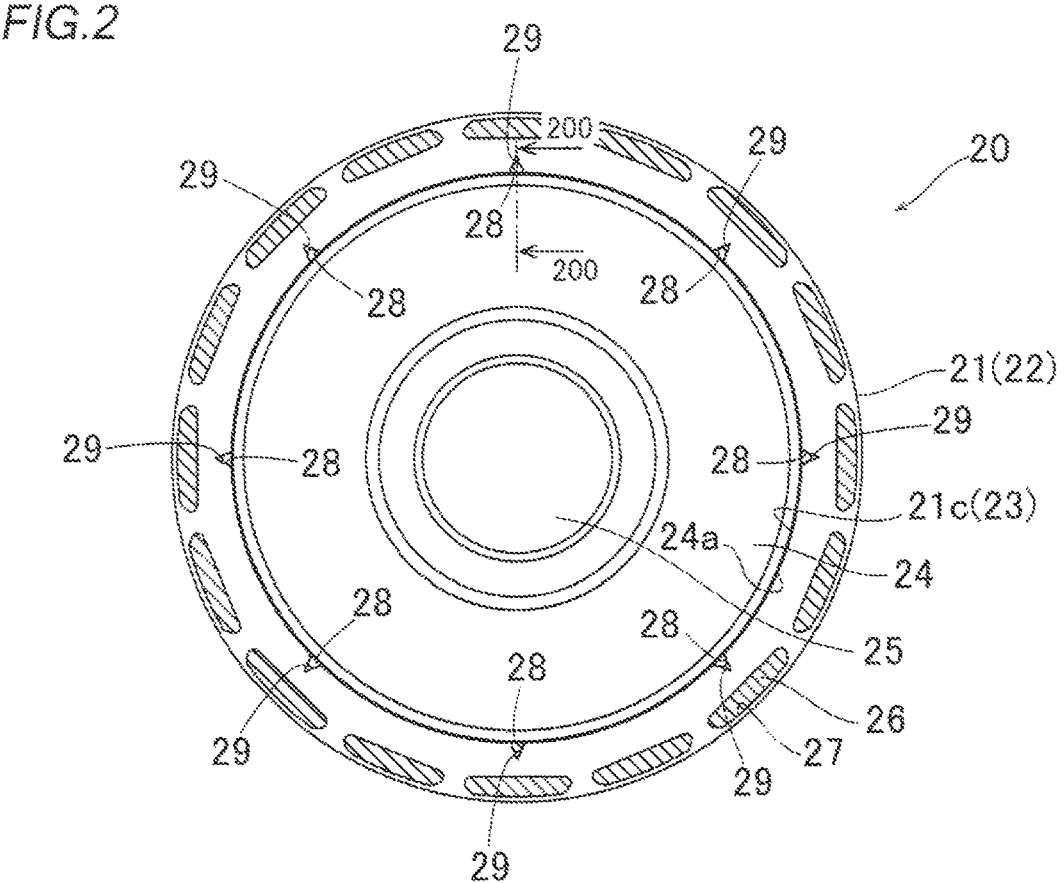
FIG. 2 is a front-side elevation of a rotor according to the first embodiment of the present disclosure as seen in an axial direction (from a Z direction side).

As illustrated in FIG. 1 and FIG. 2, the rotating electrical machine 100 includes a stator 10 and a rotor 20.

The stator 10 includes a stator core 11 and windings 12 wound around the stator core 11.

The rotor 20 includes a rotor core 21. The rotor core 21 is rotated about a rotation axis C, and is formed by stacking a plurality of electromagnetic steel sheets 22 in an axial direction (Z direction) that is a direction in which the rotation axis C extends. The rotor core 21 is provided with a through hole 23 at its rotation center. A hub member 24 is attached in the through hole 23 of the rotor core 21. A rotation shaft 25 is attached to the hub member 24. The stator core 11 and the rotor core 21 are arranged so as to face each other.

As illustrated in FIG. 1 and FIG. 2, the rotor core 21 is provided with an insertion hole 27 into which a permanent magnet 26 is inserted. A plurality of insertion holes 27 are provided along a circumferential direction of the ring-shaped rotor core 21. The insertion hole 27 is formed so as to extend through the rotor core 21 from a core end surface 21a on a Z1 direction side of the rotor core 21 (see FIG. 1) to a core end surface 21b on a Z2 direction side (see FIG. 1).

An inner side surface 21c of the rotor core 21 is provided with U-shaped groove portions 28 recessed outward in a radial direction of the rotor core 21 as seen in the axial direction. The groove portion 28 is formed so as to extend along the axial direction from the core end surface 21a on the Z1 direction side of the rotor core 21 to the core end surface 21b on the Z2 direction side. The groove portions 28 are provided at eight positions equiangularly in the circumferential direction at 45 degrees.

Figure 3:
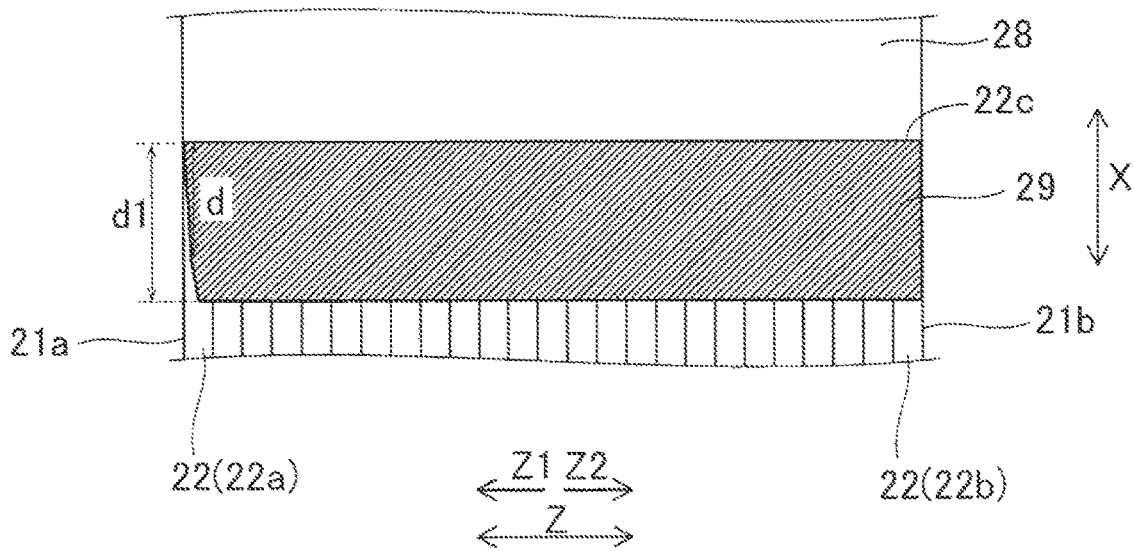
FIG. 3 is an enlarged sectional view taken along a line 200-200 in FIG. 2.

As illustrated in FIG. 2 and FIG. 3, the inner side surface 21c of the rotor core 21 is provided with core weld portions 29. The core weld portion 29 is provided so as to extend in the axial direction at the bottom of the U-shaped groove portion 28 on the inner side surface 21c of the rotor core 21. The core weld portion 29 is formed by welding the plurality of electromagnetic steel sheets 22 along the axial direction (stacking direction).

The core weld portions 29 are provided on the inner side surface 21c of the rotor core 21 at a plurality of positions spaced away from each other at a predetermined angle in the circumferential direction. Specifically, the core weld portions 29 are provided in the groove portions 28 provided at eight positions equiangularly in the circumferential direction at 45 degrees.

As illustrated in FIG. 3, in the core weld portion 29, a welding depth d gradually increases and then reaches a welding depth d1 on an electromagnetic steel sheet 22 arranged at the end of a welding start side (Z1 direction side) (hereinafter referred to as a start-side electromagnetic steel sheet 22a) out of the plurality of stacked electromagnetic steel sheets 22. Then, the welding depth is kept at d1 (substantially constant) up to an electromagnetic steel sheet 22 arranged at the end of a welding termination side (Z2 direction side) (hereinafter referred to as a termination-side electromagnetic steel sheet 22b) out of the plurality of stacked electromagnetic steel sheets 22.

(Rotor Manufacturing Method)

Figure 5:
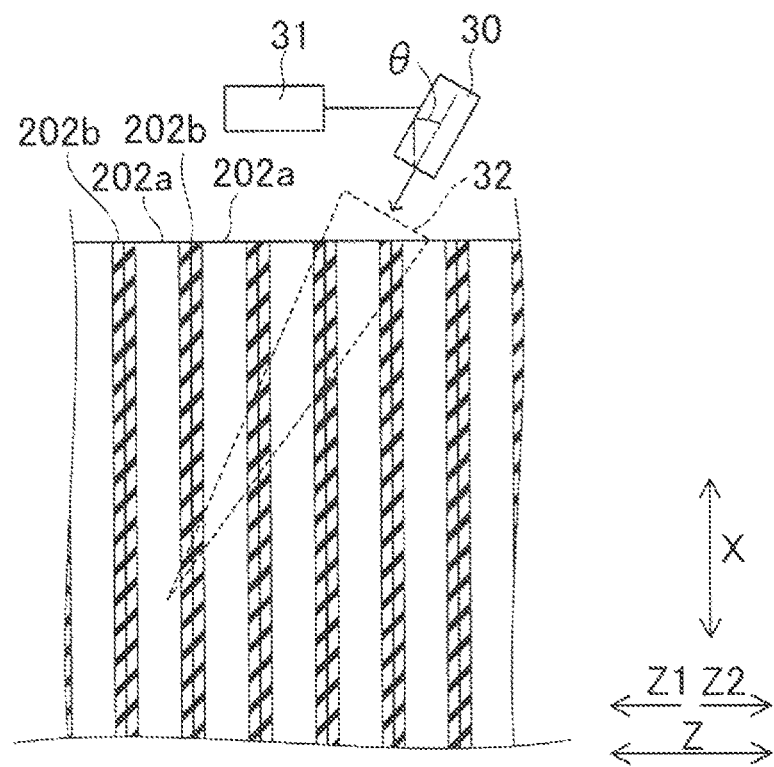
FIG. 5 is a partially enlarged view (1) of FIG. 4.
Figure 6:
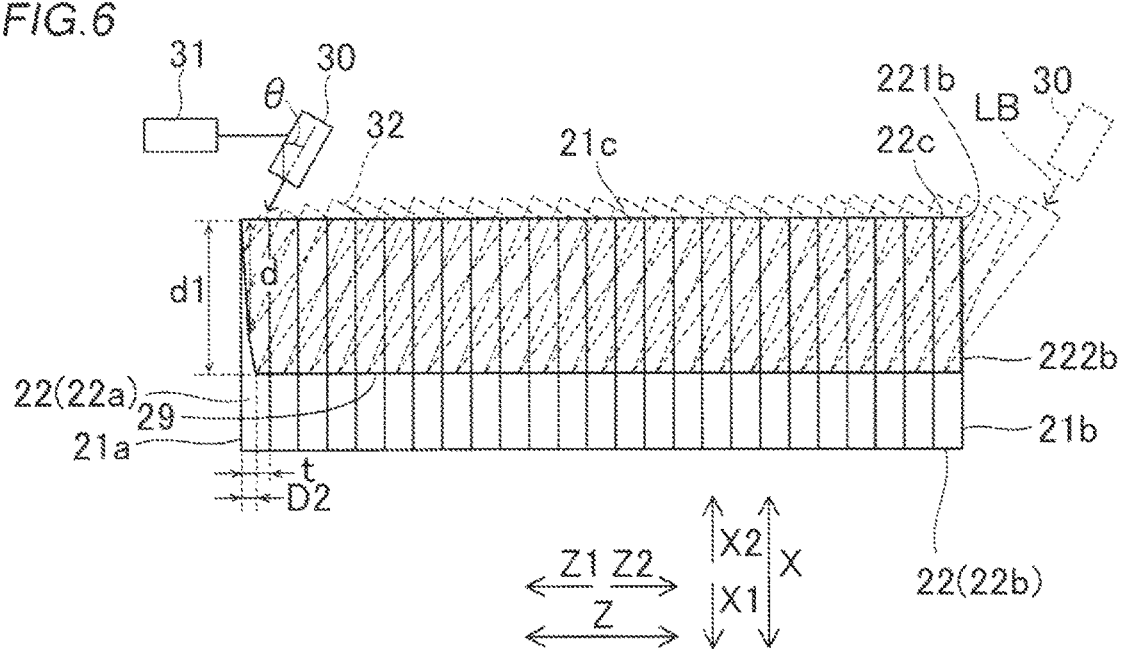
FIG. 6 is a partially enlarged view (2) of FIG. 4.

Next, a method for manufacturing the rotor 20 according to the first embodiment is described with reference to FIG. 2 and FIG. 4 to FIG. 10. In the first embodiment, a method for manufacturing (welding) the rotor core 21 of the rotor 20 is described. For the description of welding, FIG. 6 illustrates a molten portion 32 in a state in which the molten portion 32 projects out of the rotor core 21 to an X direction side and to a Z direction side. In actuality, the molten portion 32 is formed in the rotor core 21. In FIG. 6, the hatching of the core weld portion 29 (see FIG. 3) is omitted.

(Stacking Step)

Figure 4:
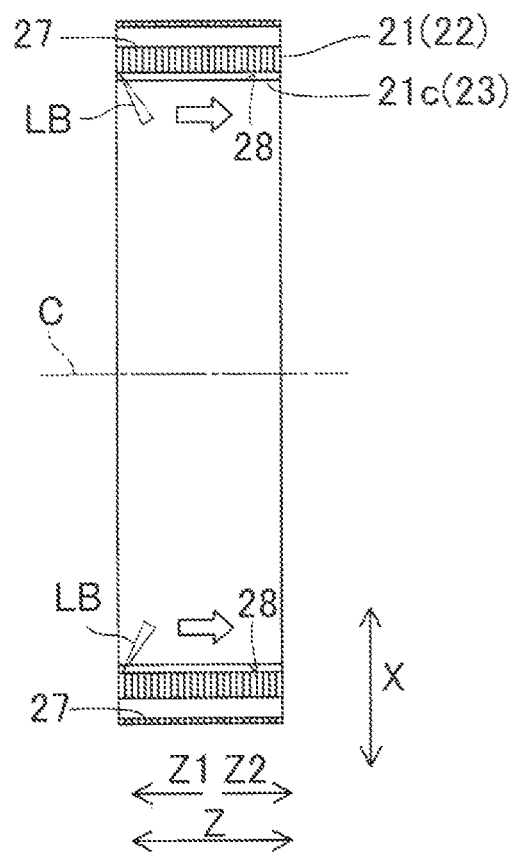
FIG. 4 is a sectional view for describing a step of forming a core weld portion on the inner side surface of a rotor core.

First, as illustrated in FIG. 4, the plurality of electromagnetic steel sheets 22 are stacked in the axial direction. As illustrated in FIG. 5, the electromagnetic steel sheet 22 includes an electromagnetic steel sheet body portion 202a (mainly an iron component) and an insulating film portion 202b that covers the electromagnetic steel sheet body portion 202a. Thus, the electromagnetic steel sheet body portions 202a and the insulating film portions 202b are alternately arranged along the stacking direction (Z direction) in the plurality of electromagnetic steel sheets 22.

(Welding Step)

Next, as illustrated in FIG. 4, the core weld portion 29 is formed on the inner side surface 21c of the rotor core 21 formed by stacking the plurality of electromagnetic steel sheets 22 in the axial direction. In this case, it is desirable to employ, for example, high-energy beam (LB) welding (laser beam, electron beam, or the like) as a welding method.

Figure 7:
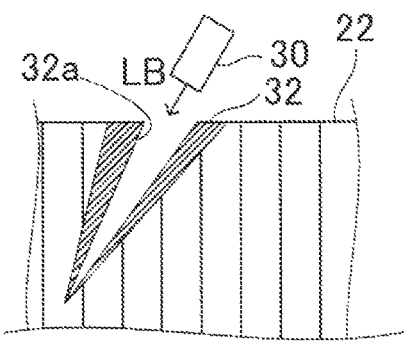
FIG. 7 is a view illustrating a relationship between a molten portion and a keyhole.
Figure 8:
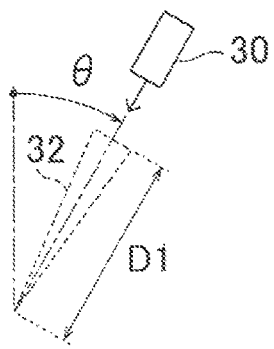
FIG. 8 is a view for describing the molten portion.

In the first embodiment, as illustrated in FIG. 5 and FIG. 6, the plurality of electromagnetic steel sheets 22 are welded by moving a welding head 30 relative to the plurality of stacked electromagnetic steel sheets 22 in a state in which the welding head 30 is inclined at a predetermined angle θ with respect to a stacking surface 22c of the electromagnetic steel sheets 22 so that the molten portion 32 passes through at least one electromagnetic steel sheet 22. That is, the plurality of electromagnetic steel sheets 22 are welded in a state in which the welding head 30 is inclined at the predetermined angle θ with respect to the stacking surface 22c of the electromagnetic steel sheets 22 so that the molten portion 32 is formed across the electromagnetic steel sheet body portion 202a and the insulating film portion 202b of the electromagnetic steel sheet 22. As illustrated in FIG. 7, the molten portion 32 is a portion of the electromagnetic steel sheet 22 that is melted into liquid by heat on an outer side of a keyhole 32a formed so as to surround a high-energy beam (LB) when the high-energy beam (LB) is radiated onto the electromagnetic steel sheet 22. A moving direction of the welding head 30 (Z2 direction) is the stacking direction in which the plurality of electromagnetic steel sheets 22 are stacked. The "stacking surface 22c of the electromagnetic steel sheets 22" means a face (surface) where adjacent electromagnetic steel sheets 22 out of the electromagnetic steel sheets 22 are stacked. The "inclination of the welding head 30 at the predetermined angle θ with respect to the stacking surface 22c of the electromagnetic steel sheets 22" means that the welding head 30 is inclined at the predetermined angle θ with respect to a plane along the stacking surface 22c of the electromagnetic steel sheets 22 (plane orthogonal to the Z axis in FIG. 5). In other words, the "inclination of the welding head 30 at the predetermined angle θ with respect to the stacking surface 22c of the electromagnetic steel sheets 22" means that the welding head 30 is inclined at the predetermined angle θ with respect to a direction (X direction) orthogonal to the moving direction of the welding head 30 (Z2 direction).

In the first embodiment, as illustrated in FIG. 5 and FIG. 6, the plurality of electromagnetic steel sheets 22 are welded so that the molten portion 32 passes through the plurality of electromagnetic steel sheets 22. Specifically, a thickness t of the electromagnetic steel sheet 22 is about 0.25 mm to about 0.3 mm, and a length (depth) D1 of the molten portion 32 is about 2 mm to about 5 mm. Thus, the molten portion 32 passes through the plurality of electromagnetic steel sheets 22.

In the first embodiment, as illustrated in FIG. 6, the plurality of electromagnetic steel sheets 22 are welded in a state in which the welding head 30 is inclined at the predetermined angle θ to a side of the moving direction of the welding head 30 (Z2 direction side). The welding head 30 is moved relative to the plurality of stacked electromagnetic steel sheets 22 while gradually increasing power of a welding heat source 31 from the start of welding. Thus, the welding is started from the core end surface 21a on one side in the stacking direction, and the plurality of stacked electromagnetic steel sheets 22 are welded in a direction to the core end surface 21b on the other side. The welding head 30 is structured to move along the groove portion 28 of the rotor core 21. Since the welding head 30 is inclined at the predetermined angle θ with respect to the stacking surface 22c of the electromagnetic steel sheets 22, the beam radiated from the welding head 30 is also inclined to the side of the moving direction (Z2 direction). As a result, the molten portion 32 (keyhole 32a) formed at a portion irradiated with the beam is also inclined to the side of the moving direction (Z2 direction). Thus, when the welding head 30 is relatively moved to the side of the moving direction (Z2 direction), the distal end of the molten portion 32 gradually moves in a depth direction of the start-side electromagnetic steel sheet 22a (to an X1 direction side) (to an inner side of the start-side electromagnetic steel sheet 22a), thereby increasing the welding depth d. That is, even in a state in which the welding head 30 does not face the start-side electromagnetic steel sheet 22a (state in which the welding head 30 passes away from the start-side electromagnetic steel sheet 22a), the distal end of the molten portion 32 is located on the start-side electromagnetic steel sheet 22a, thereby increasing the length of time during which the distal end of the molten portion 32 is located on the start-side electromagnetic steel sheet 22a. Accordingly, the welding depth d of the start-side electromagnetic steel sheet 22a increases more greatly.

By gradually increasing the power of the welding heat source 31 from the start of welding, the molten portion 32 formed at the portion irradiated with the beam (depth D1 of the molten portion 32; see FIG. 8) gradually increases in size as well. Since the molten portion 32 gradually increases in size as the welding head 30 moves in the Z2 direction, the welding depth d gradually increases in the start-side electromagnetic steel sheet 22a.

Since the power of the welding heat source 31 is gradually increased from the start of welding as illustrated in FIG. 6, the molten portion 32 does not pass through the plurality of electromagnetic steel sheets 22 immediately after the start of welding. By gradually increasing the power of the welding heat source 31, the molten portion 32 passes through the plurality of electromagnetic steel sheets 22. Thus, the molten portion 32 is formed across the electromagnetic steel sheet body portion 202a and the insulating film portion 202b of the electromagnetic steel sheet 22.

In the first embodiment, the predetermined angle θ at which the welding head 30 is inclined with respect to the stacking surface 22c of the electromagnetic steel sheets 22 is equal to or larger than 30 degrees and equal to or smaller than 60 degrees. The number of generated spatters relative to the predetermined angle θ is described in detail through an experiment described later.

Before the distal end of the molten portion 32 of the welding moves away from the electromagnetic steel sheet 22 arranged in the vicinity of the end of the welding start side out of the plurality of stacked electromagnetic steel sheets 22, the power of the welding heat source 31 reaches predetermined power, and the welding is performed up to the electromagnetic steel sheet 22 on the welding termination side (termination-side electromagnetic steel sheet 22b) while keeping the predetermined power. Specifically, the plurality of electromagnetic steel sheets 22 are welded so that the power of the welding heat source 31 is maximized (100%) before the distal end of the molten portion 32 of the welding moves away from the start-side electromagnetic steel sheet 22a out of the plurality of stacked electromagnetic steel sheets 22. More specifically, the power of the welding heat source 31 is maximized at a position where a moving distance D2 of the distal end of the molten portion 32 along the axial direction from the start of welding is smaller than the thickness t of a single electromagnetic steel sheet 22. Thus, the welding area is relatively large also in the start-side electromagnetic steel sheet 22a. In the start-side electromagnetic steel sheet 22a, the welding depth d gradually increases from zero to d1 along the Z2 direction.

The plurality of electromagnetic steel sheets 22 are welded while increasing the power of the welding heat source 31 at a constant increasing rate from the start of welding until the power of the welding heat source 31 reaches the predetermined power. That is, the power of the welding heat source 31 is increased in the manner of a linear function (linearly) with time.

The plurality of electromagnetic steel sheets 22 are welded over the range from the electromagnetic steel sheet 22 arranged at the end of the welding start side (start-side electromagnetic steel sheet 22a) to the electromagnetic steel sheet 22 arranged at the end of the welding termination side (termination-side electromagnetic steel sheet 22b) while keeping the state in which the welding head 30 is inclined at the predetermined angle θ to the side of the moving direction of the welding head 30 (Z2 direction side). That is, the welding head 30 remains inclined at the predetermined angle θ over the range from the start-side electromagnetic steel sheet 22a to the termination-side electromagnetic steel sheet 22b. After the power of the welding heat source 31 is maximized in the start-side electromagnetic steel sheet 22a, the power of the welding heat source 31 is kept maximum until the termination of welding.

The welding is performed by moving the welding head 30 while keeping the state in which the welding head 30 is inclined at the predetermined angle θ to the side of the moving direction of the welding head 30 (Z2 direction side), thereby forming the molten portion 32 across the plurality of electromagnetic steel sheets 22. Thus, an electromagnetic steel sheet 22 (portion where the vicinity of the distal end of the molten portion 32 is to be formed) located more toward the moving direction (Z2 direction) side than the electromagnetic steel sheet 22 where the distal end of the molten portion 32 is currently located is heated in advance.

Figure 9:
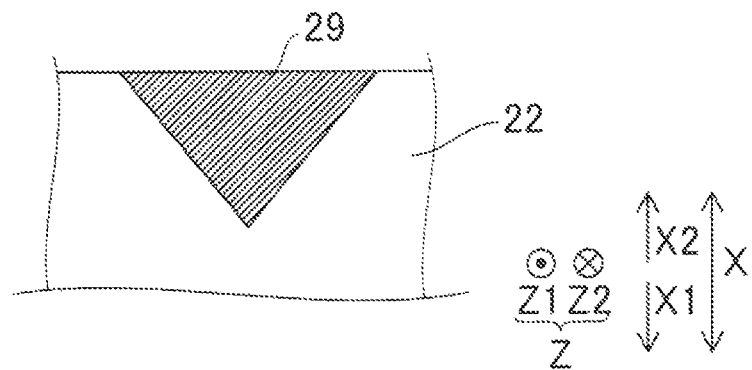
FIG. 9 is a sectional view (schematic view) of the core weld portion formed by welding according to the first embodiment of the present disclosure.
Figure 10:
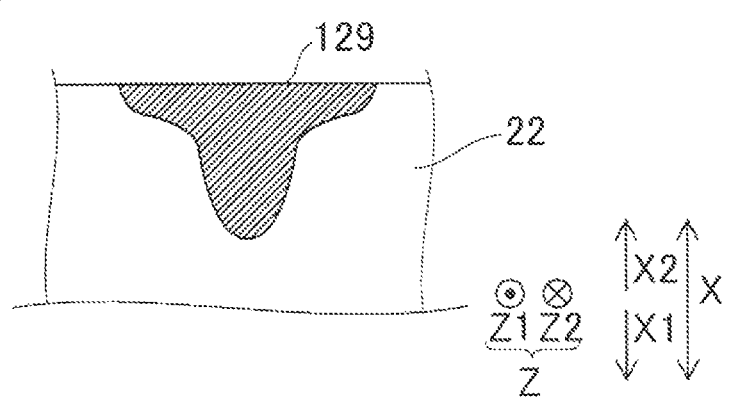
FIG. 10 is a sectional view (schematic view) of a core weld portion formed by welding according to a comparative example.

As illustrated in FIG. 9, the plurality of electromagnetic steel sheets 22 are welded so that the core weld portion 29 formed by welding has a triangular shape in its cross section in a direction orthogonal to the moving direction of the welding head 30 (cross section in a direction along the stacking surface 22c of the electromagnetic steel sheets 22). The triangular shape is a broad concept including a substantially triangular shape. Specifically, the welding is performed by moving the welding head 30 while keeping the state in which the welding head 30 is inclined at the predetermined angle θ in the moving direction of the welding head 30 (Z2 direction), thereby forming the cross section of the core weld portion 29 having a triangular shape as illustrated in FIG. 9. When the welding is performed in a state in which the welding head 30 is perpendicular to the moving direction of the welding head 30 as demonstrated in a comparative example of FIG. 10, the area (width) of the cross section of a core weld portion 129 is large on the welding head 30 side (X2 direction side), and abruptly decreases toward an opposite side (X1 direction side) of the electromagnetic steel sheet 22 from the welding head 30 side. FIG. 9 and FIG. 10 are views schematically illustrating the cross section of the core weld portion 29 (129) as seen in the Z direction.

In the first embodiment, as illustrated in FIG. 6, the welding is continuously performed from the side surfaces of the plurality of stacked electromagnetic steel sheets 22 (inner side surface 21c of the rotor core 21) to an end surface 222b on an outer side in a rotational axis direction in the electromagnetic steel sheet 22 arranged at the end of the welding termination side (termination-side electromagnetic steel sheet 22b) via a corner 221b of the electromagnetic steel sheet 22 arranged at the end of the welding termination side (termination-side electromagnetic steel sheet 22b) in the state in which the welding head 30 is inclined at the predetermined angle θ to the side of the moving direction of the welding head 30. That is, as illustrated in FIG. 6, the plurality of electromagnetic steel sheets 22 are welded so that the power of the welding heat source 31 is set to zero in the state in which the welding head 30 is inclined at the predetermined angle θ to the side of the moving direction of the welding head 30 (Z2 direction side) and in a state in which the molten portion 32 of the welding reaches the end surface in the moving direction of the welding head 30 (core end surface 21b) in the electromagnetic steel sheet 22 arranged at the end of the welding termination side (termination-side electromagnetic steel sheet 22b). The power of the welding heat source 31 is set to zero in the state in which the welding head 30 is inclined at the predetermined angle θ to the side of the moving direction of the welding head 30, before the distal end of the molten portion 32 moves away from the electromagnetic steel sheet 22 arranged at the end of the welding termination side (termination-side electromagnetic steel sheet 22b), and while the distal end of the molten portion 32 is located on the electromagnetic steel sheet 22 arranged at the end of the welding termination side (termination-side electromagnetic steel sheet 22b).

Thus, the power of the welding heat source 31 is set to zero in a state in which the welding head 30 further moves to a position on the Z2 direction side with respect to the position corresponding to the termination-side electromagnetic steel sheet 22b. As a result, the welding beam (molten portion 32) moves gradually away from the end surface of the termination-side electromagnetic steel sheet 22b on the Z2 direction side (core end surface 21b). Therefore, the generation of spatters (scattering of molten metal) can be prevented. The welding beam (molten portion 32) moves away from the end surface of the termination-side electromagnetic steel sheet 22b on the Z2 direction side (core end surface 21b) instead of from the stacking surface 22c of the termination-side electromagnetic steel sheet 22b (side surface on the X2 direction side). Therefore, the welding is performed also on the side of the end surface of the termination-side electromagnetic steel sheet 22b on the Z2 direction side (core end surface 21b). That is, the termination-side electromagnetic steel sheet 22b is sufficiently melted up to the side of the end surface of the termination-side electromagnetic steel sheet 22b on the Z2 direction side (core end surface 21b).

As described above, the termination-side electromagnetic steel sheet 22b is heated in advance before the distal end of the molten portion 32 reaches the termination-side electromagnetic steel sheet 22b. Thus, even when the power of the welding heat source 31 is set to zero before the distal end of the molten portion 32 of the welding moves away from the electromagnetic steel sheet 22 arranged at the end of the welding termination side (termination-side electromagnetic steel sheet 22b), the welding depth can be kept at d1 similarly to the other electromagnetic steel sheets 22. When the power of the welding heat source 31 remains maximum, the welding depth may be larger than d1 because heat is not easily released from the termination-side electromagnetic steel sheet 22b. In this case, the welding depth can be kept at d1 by weakening the power of the welding heat source 31 in the vicinity of the termination-side electromagnetic steel sheet 22b.

(Hub Member Inserting Step)

Finally, as illustrated in FIG. 2, the hub member 24 is inserted into the through hole 23 of the rotor core 21. Then, the inner side surface 21c of the rotor core 21 and an outer side surface 24a of the hub member 24 inserted into the through hole 23 are welded by, for example, a high-energy beam (laser beam, electron beam, or the like). Accordingly, the rotor 20 is completed.

(Experiment)

Next, an experiment on a relationship between the inclination angle of the welding head 30 and the number of spatters is described with reference to FIG. 11.

In this experiment, the number of spatters was measured when the inclination angle of the welding head 30 with respect to the stacking surface 22c of the electromagnetic steel sheets 22 was changed from 25 degrees to 90 degrees. The laser beam was radiated from the welding head 30 so that the focus of the laser beam radiated from the welding head 30 was adjusted to the side surface of the electromagnetic steel sheet 22. The moving speed of the welding head 30 was kept constant.

Figure 11:
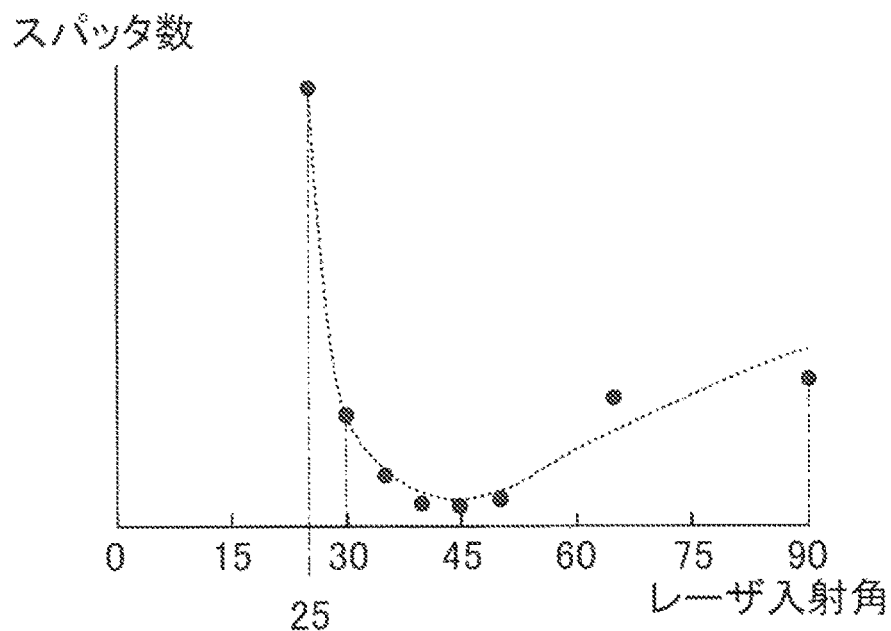
FIG. 11 is a diagram illustrating a relationship between a laser incident angle and the number of spatters.

As illustrated in FIG. 11, a relatively large number of spatters were generated when the inclination angle of the welding head 30 was 25 degrees. When the inclination angle of the welding head 30 was 30 degrees, the number of generated spatters decreased as compared to the case where the inclination angle of the welding head 30 was 25 degrees. As the inclination angle of the welding head 30 gradually increased from 30 degrees to 45 degrees, the number of generated spatters gradually decreased. As the inclination angle of the welding head 30 gradually increased from 45 degrees to 90 degrees, the number of generated spatters gradually increased. The dotted line in FIG. 11 is a line obtained by curve fitting of experiment data.

The reason why the number of spatters increases or decreases relative to the inclination angle of the welding head 30 is considered as follows. When the inclination angle of the welding head 30 with respect to the stacking surface 22c of the electromagnetic steel sheets 22 is relatively large (larger than 60 degrees), the laser incident angle with respect to the side surfaces of the stacked electromagnetic steel sheets 22 (inner side surface 21c of the rotor core 21) is relatively small. Therefore, the area of the molten portion 32 formed in the electromagnetic steel sheet 22 (area as seen in the radial direction) is relatively large, but the depth of the molten portion 32 is small. Thus, it is likely that spatters are scattered to the outside of the molten portion 32, and the number of spatters increases. When the inclination angle of the welding head 30 with respect to the stacking surface 22c of the electromagnetic steel sheets 22 is relatively small (smaller than 30 degrees), the laser incident angle with respect to the side surfaces of the stacked electromagnetic steel sheets 22 (inner side surface 21c of the rotor core 21) is relatively large. Therefore, the area of the molten portion 32 formed in the electromagnetic steel sheet 22 (area as seen in the radial direction) is relatively small, and the depth of the molten portion 32 is large. Thus, the scattering of spatters to the outside of the molten portion 32 is suppressed, but the energy density increases because the area of the molten portion 32 is relatively small. As a result, the number of spatters increases. Therefore, the inclination angle of the welding head 30 is set equal to or larger than 30 degrees and equal to or smaller than 60 degrees, whereby the increase in the number of spatters can be suppressed while suppressing the scattering of spatters to the outside of the molten portion 32 (keyhole).

In the first embodiment, as described above, the molten portion 32 of the welding is inclined with respect to the electromagnetic steel sheet 22 arranged at the end of the welding start side (start-side electromagnetic steel sheet 22a) out of the plurality of stacked electromagnetic steel sheets 22 by inclining the welding head 30 at the predetermined angle θ to the side of the moving direction of the welding head 30. By relatively moving the welding head 30 in the stacking direction of the plurality of electromagnetic steel sheets 22 while gradually increasing the power of the welding heat source 31 from the start of welding, the distal end of the molten portion 32 gradually moves in the depth direction of the start-side electromagnetic steel sheet 22a (to the inner side of the start-side electromagnetic steel sheet 22a), thereby increasing the welding depth d. That is, even in the state in which the welding head 30 does not face the start-side electromagnetic steel sheet 22a (state in which the welding head 30 passes away from the start-side electromagnetic steel sheet 22a), the distal end of the molten portion 32 is located on the start-side electromagnetic steel sheet 22a. As a result, the length of time during which the distal end of the molten portion 32 is located on the start-side electromagnetic steel sheet 22a increases as compared to the case where the welding head 30 is arranged orthogonally (perpendicularly) to the stacking direction of the plurality of electromagnetic steel sheets 22 (moving direction of the welding head 30). Therefore, the welding depth d of the start-side electromagnetic steel sheet 22a increases more greatly, whereby a necessary welding area can be secured. By gradually increasing the power of the welding heat source 31 from the start of welding, an abrupt temperature increase at the end of the rotor core 21 (start-side electromagnetic steel sheet 22a) is suppressed. Therefore, the generation of spatters at the end of the rotor core 21 and damage to the end of the rotor core 21 are suppressed, whereby the welding quality can be stabilized. As a result, the joining strength of the rotor core 21 can be secured while stabilizing the welding quality at the end of the rotor core 21.

In the first embodiment, as described above, the step of welding the plurality of electromagnetic steel sheets 22 is a step in which the power of the welding heat source 31 reaches the predetermined power before the distal end of the molten portion 32 of the welding moves away from the electromagnetic steel sheet 22 arranged in the vicinity of the end of the welding start side out of the plurality of stacked electromagnetic steel sheets 22 and the welding is performed up to the electromagnetic steel sheet 22 on the welding termination side while keeping the predetermined power. Thus, the welding area (molten portion 32) is relatively large also in the electromagnetic steel sheet 22 arranged in the vicinity of the end of the welding start side, whereby a necessary welding area can easily be secured also in the electromagnetic steel sheet 22 arranged in the vicinity of the end.

In the first embodiment, as described above, the step of welding the plurality of electromagnetic steel sheets 22 is a step in which the power of the welding heat source 31 reaches the predetermined power (maximum) before the distal end of the molten portion 32 of the welding moves away from the electromagnetic steel sheet 22 arranged at the end of the welding start side out of the plurality of stacked electromagnetic steel sheets 22 and the welding is performed up to the electromagnetic steel sheet 22 on the welding termination side while keeping the predetermined power. Thus, the welding area (molten portion 32) is relatively large in the electromagnetic steel sheet 22 arranged at the end of the welding start side (start-side electromagnetic steel sheet 22a) that is likely to peel off relatively. Accordingly, it is particularly effective to set the power to the predetermined power before the distal end of the molten portion 32 of the welding moves away from the start-side electromagnetic steel sheet 22a.

In the first embodiment, as described above, the step of welding the plurality of electromagnetic steel sheets 22 is a step of welding the plurality of electromagnetic steel sheets 22 while increasing the power of the welding heat source 31 at the constant increasing rate from the start of welding until the power of the welding heat source 31 reaches the predetermined power. Thus, the control on the power of the welding heat source 31 can be facilitated unlike a case where the power of the welding heat source 31 is changed complexly.

In the first embodiment, as described above, the step of welding the plurality of electromagnetic steel sheets 22 is a step of welding the plurality of electromagnetic steel sheets 22 over the range from the electromagnetic steel sheet 22 arranged at the end of the welding start side to the electromagnetic steel sheet 22 arranged at the end of the welding termination side while keeping the state in which the welding head 30 is inclined at the predetermined angle θ to the side of the moving direction of the welding head 30. Thus, the cross section of the core weld portion 29 can easily be formed into a triangular shape (see FIG. 9).

In the first embodiment, as described above, the step of welding the plurality of electromagnetic steel sheets 22 is a step of welding the plurality of electromagnetic steel sheets 22 so that the power of the welding heat source 31 is set to zero in the state in which the welding head 30 is inclined at the predetermined angle θ to the side of the moving direction of the welding head 30 and in the state in which the molten portion 32 of the welding reaches the end surface on the side of the moving direction of the welding head 30 (core end surface 21b) in the electromagnetic steel sheet 22 arranged at the end of the welding termination side. Thus, the welding beam (molten portion 32) moves gradually away from the end surface of the termination-side electromagnetic steel sheet 22b in the moving direction of the welding head 30 (Z2 direction) (core end surface 21b). Accordingly, the generation of spatters (scattering of molten metal) can be prevented.

In the first embodiment, as described above, the step of welding the plurality of electromagnetic steel sheets 22 is a step of welding the plurality of electromagnetic steel sheets 22 so that the power of the welding heat source 31 is set to zero in the state in which the welding head 30 is inclined at the predetermined angle θ to the side of the moving direction of the welding head 30, before the distal end of the molten portion 32 of the welding moves away from the electromagnetic steel sheet 22 arranged at the end of the welding termination side, and while the distal end of the molten portion 32 of the welding is located on the electromagnetic steel sheet 22 arranged at the end of the welding termination side. Thus, the distal end of the molten portion 32 does not reach the end surface of the termination-side electromagnetic steel sheet 22b on the side of the moving direction of the welding head 30 (Z2 direction side) (core end surface 21b). Accordingly, the generation of spatters (scattering of molten metal) can be prevented effectively.

In the first embodiment, as described above, the step of welding the plurality of electromagnetic steel sheets 22 is a step of welding the plurality of electromagnetic steel sheets 22 so that the core weld portion 29 formed by welding has a triangular shape in its cross section in the direction orthogonal to the moving direction of the welding head 30. Thus, the area (welding area) of the core weld portion 29 can be increased as compared to the case where the area (width) of the cross section of the core weld portion 29 abruptly decreases toward the opposite side of electromagnetic steel sheet 22 from the welding head 30 side (see FIG. 10).

Second Embodiment (Rotating Electrical Machine Manufacturing Method)

Figure 12:
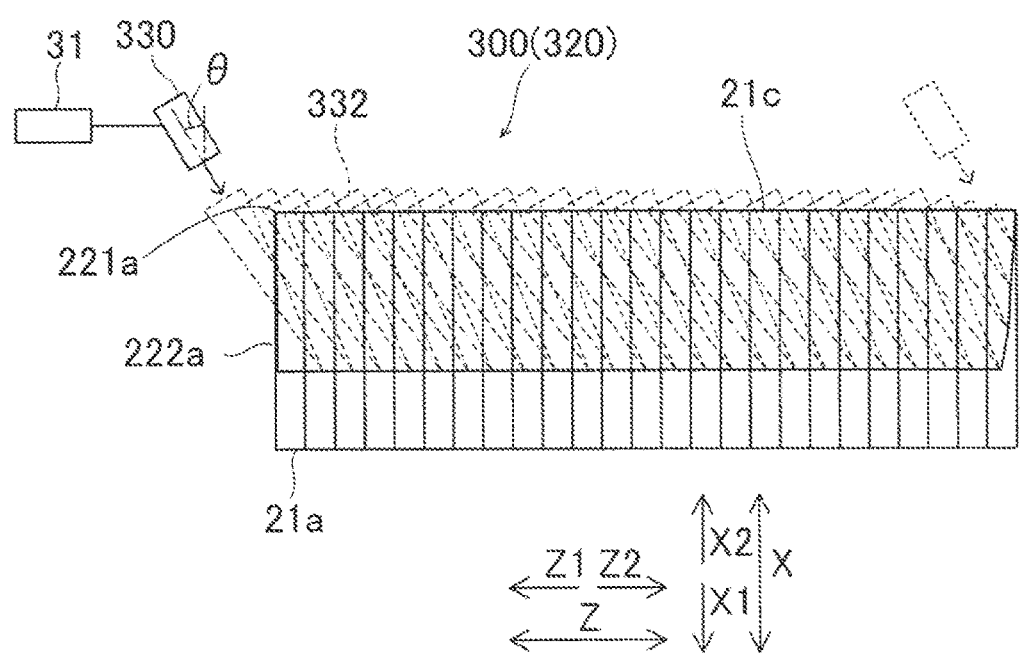
FIG. 12 is a view for describing a rotor manufacturing method according to a second embodiment of the present disclosure.

A method for manufacturing a rotating electrical machine 300 (rotor 320) according to a second embodiment is described with reference to FIG. 12.

The stacking step is similar to that of the first embodiment described above.

(Welding Step)

In the second embodiment, the plurality of electromagnetic steel sheets 22 are welded by moving a welding head 330 relative to the plurality of electromagnetic steel sheets 22 in a state in which the welding head 330 is inclined at the predetermined angle θ to an opposite side (Z1 direction side) to that of a moving direction of the welding head 330 (Z2 direction). The predetermined angle θ is equal to or larger than 30 degrees and equal to or smaller than 60 degrees.

In the second embodiment, the welding is continuously performed from an end surface 222a on an outer side in the rotational axis direction in the electromagnetic steel sheet 22 arranged at the end of the welding start side to the side surfaces of the plurality of stacked electromagnetic steel sheets 22 (inner side surface 21c of the rotor core 21) via a corner 221a of the electromagnetic steel sheet 22 arranged at the end of the welding start side in the state in which the welding head 330 is inclined at the predetermined angle θ to the opposite side (Z1 direction side) to that of the moving direction of the welding head 330 (Z2 direction). The power of the welding heat source 31 may gradually be increased at the start of welding, or may be set to the predetermined power (maximum power) from the start.

The welding head 330 is moved relative to the plurality of stacked electromagnetic steel sheets 22 while gradually reducing the power of the welding heat source 31 in the state in which the welding head 330 is inclined at the predetermined angle θ to the opposite side (Z1 direction side) to that of the moving direction of the welding head 330 (Z2 direction). Thus, the welding of the plurality of electromagnetic steel sheets 22 is terminated. Specifically, the power of the welding heat source 31 is set to zero while being gradually reduced in a state in which the distal end of a molten portion 332 reaches the electromagnetic steel sheet 22 arranged at the end of the welding termination side (state in which the molten portion 332 does not pass through the electromagnetic steel sheet 22). As a result, the welding beam moves gradually away from the electromagnetic steel sheet 22. Accordingly, the generation of spatters (scattering of molten metal) can be prevented.

The other manufacturing steps of the second embodiment are similar to those of the first embodiment described above.

Third Embodiment (Rotating Electrical Machine Manufacturing Method)

Figure 13:
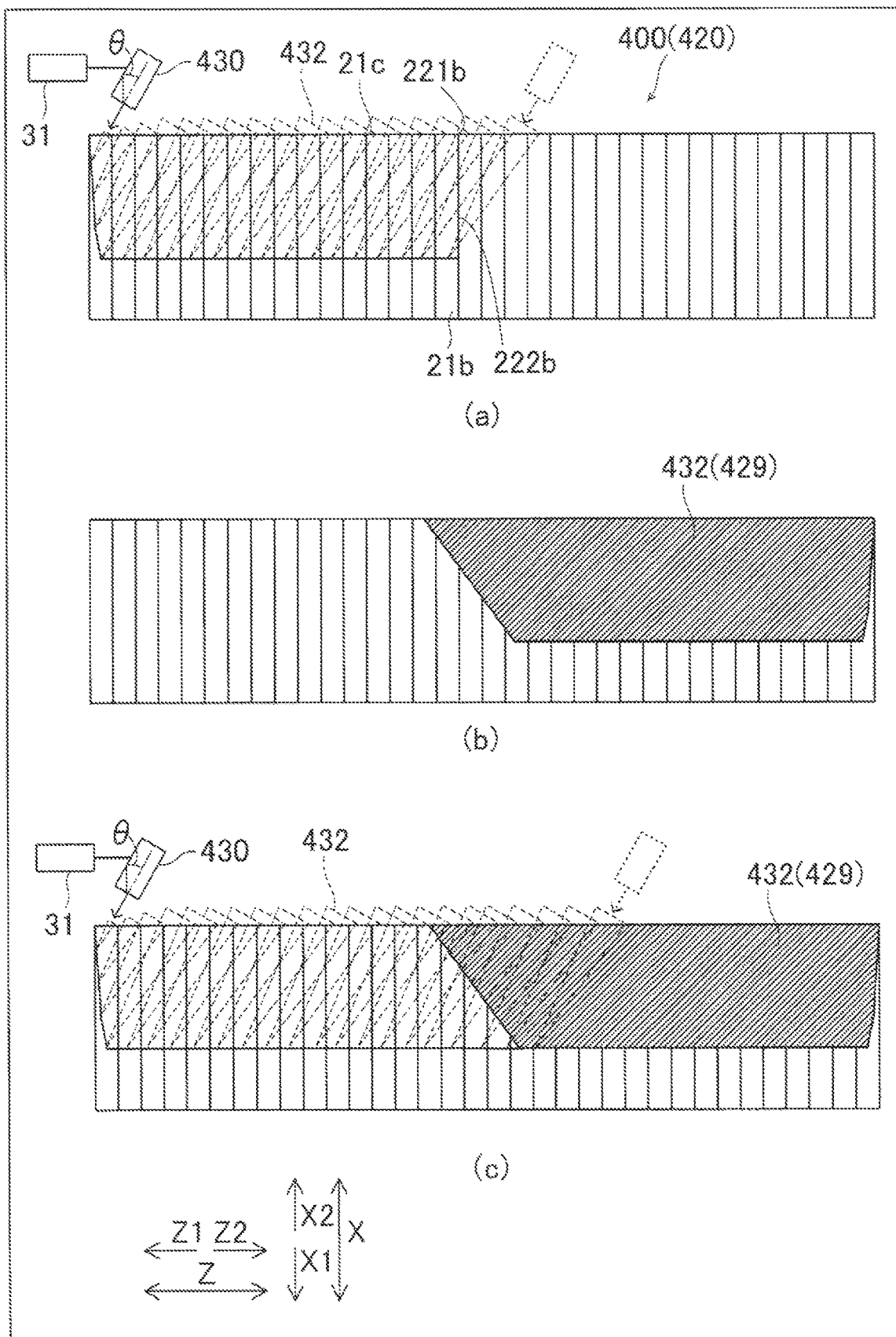
FIG. 13 is a view for describing a rotor manufacturing method according to a third embodiment of the present disclosure.

A method for manufacturing a rotating electrical machine 400 (rotor 420) according to a third embodiment is described with reference to FIG. 13.

The stacking step is similar to that of the first embodiment described above.

(Welding Step)

In the third embodiment, as illustrated in FIG. 13A, the welding is started from one end side of the plurality of stacked electromagnetic steel sheets 22 in the stacking direction. The welding is performed while gradually increasing the power of the welding heat source 31 from the start of welding in a state in which a welding head 430 is inclined at the predetermined angle θ to a side of a moving direction of the welding head 430. The welding is performed up to the vicinity of a substantially central portion of the plurality of stacked electromagnetic steel sheets 22. The welding is continuously performed by using the welding head 430 from the side surfaces of the plurality of stacked electromagnetic steel sheets 22 (inner side surface 21c of the rotor core 21) to the end surface 222b of the electromagnetic steel sheet 22 arranged on the welding termination side (in the vicinity of the substantially central portion) via the corner 221b of the electromagnetic steel sheet 22 arranged on the welding termination side. Then, the plurality of stacked electromagnetic steel sheets 22 are reversed as illustrated in FIG. 13B, and the welding is started from the other end side of the plurality of reversed electromagnetic steel sheets 22 in the stacking direction and is performed up to the vicinity of the substantially central portion of the plurality of stacked electromagnetic steel sheets 22 as illustrated in FIG. 13C. In the vicinity of the substantially central portion of the electromagnetic steel sheets 22 in the stacking direction, the welding is performed so that molten portions 432 (core weld portions 429) overlap each other (have an overlap allowance) before and after the reversing.

The other manufacturing steps of the third embodiment are similar to those of the first embodiment described above.

Fourth Embodiment (Rotating Electrical Machine Manufacturing Method)

Figure 14:
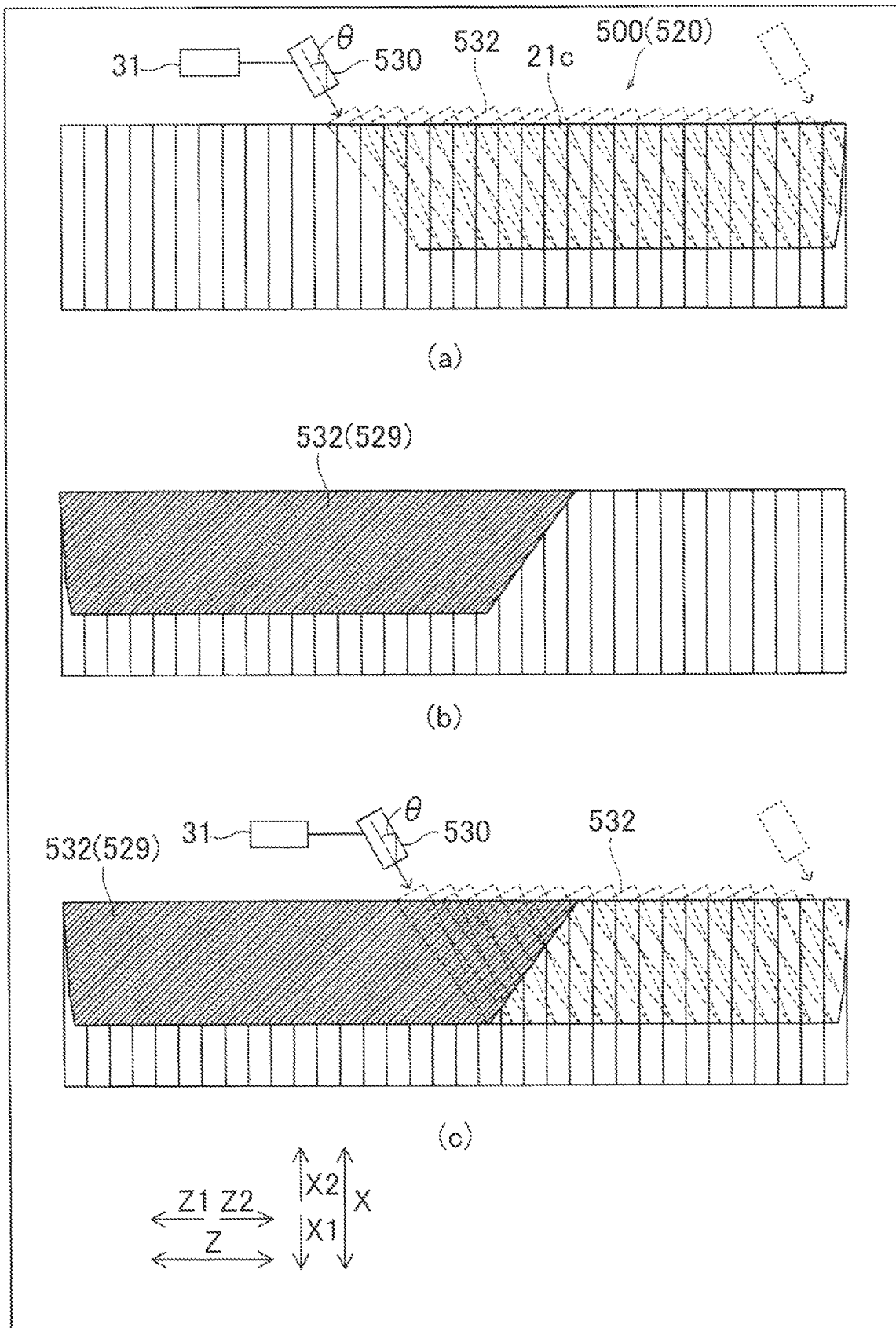
FIG. 14 is a view for describing a rotor manufacturing method according to a fourth embodiment of the present disclosure.

A method for manufacturing a rotating electrical machine 500 (rotor 520) according to a fourth embodiment is described with reference to FIG. 14.

The stacking step is similar to that of the first embodiment described above.

(Welding Step)

In the fourth embodiment, as illustrated in FIG. 14A, the welding is started from the vicinity of a substantially central portion of the plurality of stacked electromagnetic steel sheets 22 in the stacking direction. The welding is performed in a state in which a welding head 530 is inclined at the predetermined angle θ to an opposite side (Z1 direction side) to that of a moving direction of the welding head 530 and in a state in which the power of the welding heat source 31 is set to the predetermined power (or while gradually increasing the power) from the start of welding. The welding head 530 is moved relative to the plurality of stacked electromagnetic steel sheets 22 while gradually reducing the power of the welding heat source 31. Thus, the welding of the plurality of electromagnetic steel sheets 22 is terminated. Then, the plurality of stacked electromagnetic steel sheets 22 are reversed as illustrated in FIG. 14B, and the welding is started from the vicinity of the substantially central portion of the plurality of reversed electromagnetic steel sheets 22 in the stacking direction and is performed up to the end side of the plurality of stacked electromagnetic steel sheets 22 as illustrated in FIG. 14C. In the vicinity of the substantially central portion of the electromagnetic steel sheets 22 in the stacking direction, the welding is performed so that molten portions 532 (core weld portions 529) overlap each other (have an overlap allowance) before and after the reversing.

The other manufacturing steps of the fourth embodiment are similar to those of the first embodiment described above.

Fifth Embodiment (Structure of Rotating Electrical Machine)

Figure 15:
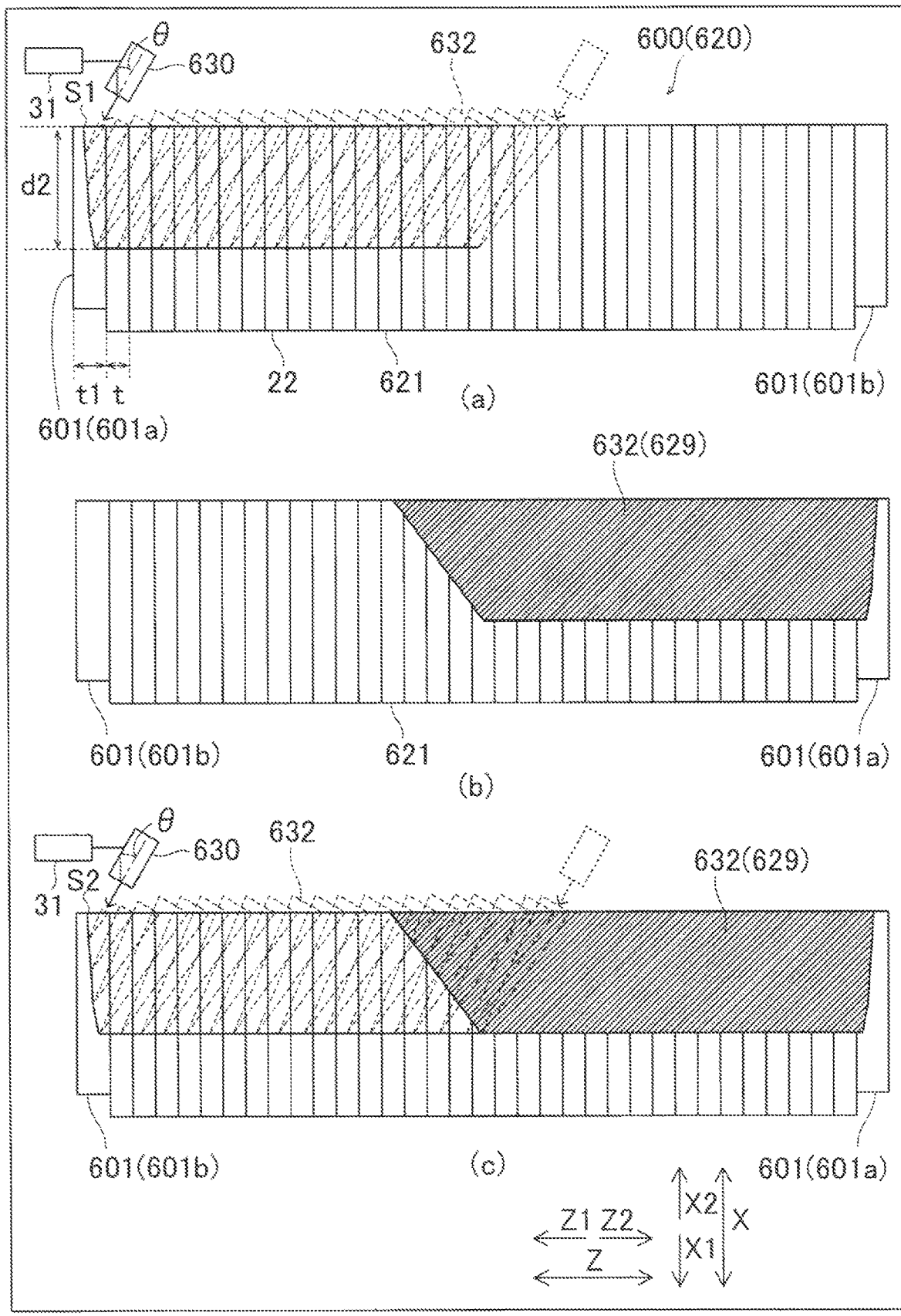
FIG. 15 is a view for describing a rotor manufacturing method according to a fifth embodiment of the present disclosure.

The structure of a rotating electrical machine 600 (rotor 620) according to a fifth embodiment is described with reference to FIG. 15.

In the rotating electrical machine 600 (rotor 620), end plates 601 (end plates 601a and 601b) are provided at the ends of the plurality of stacked electromagnetic steel sheets 22 in the rotational axis direction. The end plate 601 has a function of reducing the occurrence of a situation in which a resin (not illustrated) for fixing the permanent magnets 26 (see FIG. 1) inserted into the insertion holes 27 (see FIG. 1) of a rotor core 621 projects out of the rotor 620. The end plate 601 has a substantially ring-like shape.

The end plate 601 includes a non-magnetic substance containing iron. For example, the end plate 601 is structured by SUS (stainless steel) 304. A thickness t1 of the end plate 601 is larger than the thickness t of a single electromagnetic steel sheet 22. The surface of the electromagnetic steel sheet 22 is provided with the insulating film portion 202b (see FIG. 5). The end plate 601 is not provided with the insulating film portion 202b.

The other structures of the fifth embodiment are similar to those of the first embodiment described above.

(Rotating Electrical Machine Manufacturing Method)

A method for manufacturing the rotating electrical machine 600 (rotor 620) according to the fifth embodiment is described with reference to FIG. 15.

The stacking step is similar to that of the first embodiment described above.

(End Plate Arranging Step)

Next, the end plates 601 are arranged at the ends of the rotor core 621 (plurality of stacked electromagnetic steel sheets 22) in the rotational axis direction. The end plates 601 (end plates 601a and 601b) are arranged at both ends of the rotor core 621 in the rotational axis direction.

(Welding Step)

In the fifth embodiment, as illustrated in FIG. 15A, the end plate 601 and the electromagnetic steel sheet 22 adjacent to the end plate 601 are welded so that the distal end of a molten portion 632 is located on the end plate 601 and the molten portion 632 is formed across the end plate 601 and the electromagnetic steel sheet 22 adjacent to the end plate 601.

Specifically, a welding head 630 is moved relative to the end plate 601a while gradually increasing the power of the welding heat source 31 from the start of welding (welding start point S1) in a state in which the welding head 630 is inclined at the predetermined angle θ to a side of a moving direction of the welding head 630 (Z2 direction side). Thus, a welding depth d2 (welding sectional area) gradually increases. The power of the welding heat source 31 is set to the maximum power (or the predetermined power) in the state in which the distal end of the molten portion 632 is located on the end plate 601a. Thus, a portion having the maximum welding depth d2 (portion having the maximum welding sectional area) is arranged in the end plate 601a.

Then, the welding head 630 is moved in a state in which the power of the welding heat source 31 is kept at the maximum power. Thus, the end plate 601a and the electromagnetic steel sheet 22 adjacent to the end plate 601a are welded so that the distal end of the molten portion 632 is located on the end plate 601a and the molten portion 632 is formed across the end plate 601a and the electromagnetic steel sheet 22 adjacent to the end plate 601a.

Then, the plurality of stacked electromagnetic steel sheets 22 are reversed as illustrated in FIG. 15B, and the welding head 630 is moved relative to the end plate 601b while gradually increasing the power of the welding heat source 31 from the start of welding (welding start point S2) as illustrated in FIG. 15C. Then, the welding head 630 is moved in a state in which the power of the welding heat source 31 is kept at the maximum power. Thus, the end plate 601b and the electromagnetic steel sheet 22 adjacent to the end plate 601b are welded so that the distal end of the molten portion 632 is located on the end plate 601b and the molten portion 632 is formed across the end plate 601b and the electromagnetic steel sheet 22 adjacent to the end plate 601b. The welding is performed up to the vicinity of a substantially central portion of the plurality of stacked electromagnetic steel sheets 22. In the vicinity of the substantially central portion of the electromagnetic steel sheets 22 in the stacking direction, the welding is performed so that the molten portions 632 (core weld portions 629) overlap each other (have an overlap allowance) before and after the reversing.

The other manufacturing steps of the fifth embodiment are similar to those of the first embodiment described above.

(Effects of First to Fifth Embodiments)

In the first to fifth embodiments, the following effects can be attained.

As described above, the first to fifth embodiments provide the step of welding the plurality of electromagnetic steel sheets (22) by moving the welding head (30, 330, 430, 530, 630) relative to the plurality of stacked electromagnetic steel sheets (22) in the state in which the welding head (30, 330, 430, 530, 630) is inclined at the predetermined angle (θ) with respect to the stacking surface (22c) of the electromagnetic steel sheets (22) so that the molten portion (32, 332, 432, 532, 632) passes through at least one electromagnetic steel sheet (22). Thus, during the welding, the molten portion (32, 332, 432, 532, 632) is brought into a state in which the iron component (electromagnetic steel sheet body portion (202a)) and the insulating film portion (202b) are mixed together, thereby stabilizing the components of the molten portion (32, 332, 432, 532, 632) during the welding. That is, the variation between the ratio of the iron component and the ratio of the insulating film portion (202b) is reduced in the molten portion (32, 332, 432, 532, 632). Thus, spatters (splashing or scattering) due to a relatively large ratio of the insulating film portion (202b) are reduced. As a result, the welding quality of the molten portion (32, 332, 432, 532, 632) can be stabilized.

By moving the welding head (30, 330, 430, 530, 630) relative to the plurality of stacked electromagnetic steel sheets (22) in the state in which the welding head (30, 330, 430, 530, 630) is inclined, the molten portion (32, 332, 432, 532, 632) gradually moves along the stacking direction of the plurality of stacked electromagnetic steel sheets (22), thereby reducing an abrupt temperature change on the stacking surface (side surface) of the electromagnetic steel sheets (22). Thus, deterioration of the welding quality of the molten portion (32, 332, 432, 532, 632), such as weld cracking, is prevented.

In the first to fifth embodiments, as described above, the plurality of electromagnetic steel sheets (22) are welded in the state in which the welding head (30, 330, 430, 530, 630) is inclined at the predetermined angle (θ) with respect to the stacking surface (22c) of the electromagnetic steel sheets (22) so that the molten portion (32, 332, 432, 532, 632) is formed across the electromagnetic steel sheet body portion (202a) and the insulating film portion (202b) of the electromagnetic steel sheet (22). With this structure, the molten portion (32, 332, 432, 532, 632) is easily brought into the state in which the iron component (electromagnetic steel sheet body portion (202a)) and the insulating film portion (202b) are mixed together. Thus, the welding quality of the molten portion (32, 332, 432, 532, 632) can be stabilized.

In the first to fifth embodiments, as described above, the plurality of electromagnetic steel sheets (22) are welded in the state in which the welding head (30, 330, 430, 530, 630) is inclined at the predetermined angle (θ) with respect to the stacking surface (22c) of the electromagnetic steel sheets (22) so that the molten portion (32, 332, 432, 532, 632) passes through the plurality of electromagnetic steel sheets (22). With this structure, the laser incident angle with respect to the electromagnetic steel sheet (22) is smaller (the energy density is smaller) than that in a case where the molten portion (32, 332, 432, 532, 632) passes through only a single electromagnetic steel sheet (22). Thus, the generation of spatters can be suppressed.

In the first, third, and fifth embodiments, as described above, the plurality of electromagnetic steel sheets (22) are welded by moving the welding head (30, 430, 630) relative to the plurality of electromagnetic steel sheets (22) in the state in which the welding head (30, 430, 630) is inclined at the predetermined angle (θ) to the side of the moving direction of the welding head (30, 430, 630). With this structure, the distal end of the molten portion (32, 432, 632) reaches the deep side (depth direction side) of the electromagnetic steel sheet (22) arranged at the end of the welding start side. Thus, the welding depth can be increased in the electromagnetic steel sheet (22) arranged at the end of the welding start side.

In the first, third, and fifth embodiments, as described above, the plurality of electromagnetic steel sheets (22) are welded by moving the welding head (30, 430, 630) relative to the plurality of stacked electromagnetic steel sheets (22) while gradually increasing the power of the welding heat source (31) from the start of welding in the state in which the welding head (30, 430, 630) is inclined at the predetermined angle (θ) to the side of the moving direction of the welding head (30, 430, 630). This structure reduces the occurrence of a situation in which a relatively high-power laser beam enters the electromagnetic steel sheet (22) arranged at the end of the welding start side. Thus, the generation of spatters can be suppressed at the end of the welding start side.

In the first, third, and fifth embodiments, as described above, the welding is continuously performed from the side surfaces of the plurality of stacked electromagnetic steel sheets (22) to the end surface (222b) on the outer side in the rotational axis direction in the electromagnetic steel sheet (22) arranged at the end of the welding termination side via the corner (221b) of the electromagnetic steel sheet (22) arranged at the end of the welding termination side in the state in which the welding head (30, 430, 630) is inclined at the predetermined angle (θ) to the side of the moving direction of the welding head (30, 430, 630). With this structure, not only the side surface but also the end surface (222b) of the electromagnetic steel sheet (22) arranged at the end of the welding termination side is welded. Thus, a desired (sufficient) welding sectional area can be secured in the electromagnetic steel sheet (22) arranged at the end of the welding termination side.

In the second and fourth embodiments, as described above, the plurality of electromagnetic steel sheets (22) are welded by moving the welding head (330, 530) relative to the plurality of electromagnetic steel sheets (22) in the state in which the welding head (330, 530) is inclined at the predetermined angle (θ) to the opposite side to that of the moving direction of the welding head (330, 530). With this structure, the distal end of the molten portion (332, 532) reaches the deep side (depth direction side) of the electromagnetic steel sheet (22) arranged at the end of the welding termination side. Thus, the welding depth can be increased in the electromagnetic steel sheet (22) arranged at the end of the welding termination side.

In the second and fourth embodiments, as described above, the welding of the plurality of electromagnetic steel sheets (22) is terminated by moving the welding head (330, 530) relative to the plurality of stacked electromagnetic steel sheets (22) while gradually reducing the power of the welding heat source (31) in the state in which the welding head (330, 530) is inclined at the predetermined angle (θ) to the opposite side to that of the moving direction of the welding head (330, 530). This structure reduces the occurrence of a situation in which a relatively high-power laser beam enters the electromagnetic steel sheet (22) arranged at the end of the welding termination side. Thus, the generation of spatters can be suppressed at the end of the welding termination side.

In the second embodiment, as described above, the welding is continuously performed from the end surface (222a) on the outer side in the rotational axis direction in the electromagnetic steel sheet (22) arranged at the end of the welding start side to the side surfaces of the plurality of stacked electromagnetic steel sheets (22) via the corner (221a) of the electromagnetic steel sheet (22) arranged at the end of the welding start side in the state in which the welding head (330) is inclined at the predetermined angle (θ) to the opposite side to that of the moving direction of the welding head (330). With this structure, not only the side surface but also the end surface (222a) of the electromagnetic steel sheet (22) arranged at the end of the welding start side is welded. Thus, a desired (sufficient) welding sectional area can be secured in the electromagnetic steel sheet (22) arranged at the end of the welding start side.

In the third embodiment, as described above, the welding is started from one end of the plurality of stacked electromagnetic steel sheets (22) in the stacking direction and is performed up to the vicinity of the substantially central portion of the plurality of stacked electromagnetic steel sheets (22). Then, the plurality of stacked electromagnetic steel sheets (22) are reversed, and the welding is started from the other end side of the plurality of reversed electromagnetic steel sheets (22) in the stacking direction and is performed up to the vicinity of the substantially central portion of the plurality of stacked electromagnetic steel sheets (22). With this structure, even if the diameter of the through hole of the annular electromagnetic steel sheet (22) is relatively small and the welding head (430) cannot move inside up to the deep side of the through holes of the stacked electromagnetic steel sheets (22), the plurality of electromagnetic steel sheets (22) can be welded from one end to the other end.

In the fourth embodiment, as described above, the welding is started from the vicinity of the substantially central portion of the plurality of stacked electromagnetic steel sheets (22) in the stacking direction and is performed up to one end side of the plurality of stacked electromagnetic steel sheets (22). Then, the plurality of stacked electromagnetic steel sheets (22) are reversed, and the welding is started from the vicinity of the substantially central portion of the plurality of reversed electromagnetic steel sheets (22) in the stacking direction and is performed up to the other end side of the plurality of stacked electromagnetic steel sheets (22). With this structure, even if a free space on the end side of the plurality of stacked electromagnetic steel sheets (22) in the rotational axis direction is relatively small and the welding head (530) is difficult to arrange, the plurality of electromagnetic steel sheets (22) can easily be welded from one end to the other end.

In the first to fifth embodiments, as described above, the predetermined angle (θ) is equal to or larger than 30 degrees and equal to or smaller than 60 degrees. With this structure, as demonstrated in the experiment described above, the increase in the number of spatters can be suppressed while suppressing the scattering of spatters to the outside of the molten portion (32, 332, 432, 532, 632).

In the fifth embodiment, as described above, the end plate (601) and the electromagnetic steel sheet (22) adjacent to the end plate (601) are welded so that the distal end of the molten portion (632) is located on the end plate (601) and the molten portion (632) is formed across the end plate (601) and the electromagnetic steel sheet (22) adjacent to the end plate (601). With this structure, the end plate (601) is not provided with the insulating film portion (202b). Therefore, even when a relatively high-power laser beam is radiated onto the end plate (601), splashing of the gasified insulating film portion (202b) does not occur. As a result, the generation of spatters can be prevented.

Modified Examples

It should be understood that the embodiments disclosed herein are illustrative but are not limitative in all respects.

For example, in the first to fourth embodiments described above, description is given of the example in which the power of the welding heat source is maximized before the distal end of the molten portion (keyhole) of the welding moves away from the electromagnetic steel sheet arranged at the end of the welding start side (start-side electromagnetic steel sheet) out of the plurality of stacked electromagnetic steel sheets. However, the present disclosure is not limited to this example. For example, as long as a necessary welding area can be secured, the power of the welding heat source may be maximized when the distal end of the keyhole of the welding is located on an electromagnetic steel sheet other than the start-side electromagnetic steel sheet (such as a second electromagnetic steel sheet from the start-side electromagnetic steel in the vicinity of the core end surface).

In the first to fourth embodiments described above, description is given of the example in which the power of the welding heat source is maximized before the distal end of the molten portion (keyhole) of the welding moves away from the start-side electromagnetic steel sheet. However, the present disclosure is not limited to this example. For example, the power of the welding heat source may be set to power capable of welding the electromagnetic steel sheets (power lower than the maximum power) before the distal end of the keyhole of the welding moves away from the start-side electromagnetic steel sheet, and the welding may be performed up to the electromagnetic steel sheet on the welding termination side while keeping this power.

In the first to fifth embodiments described above, description is given of the example in which the power of the welding heat source is increased at the constant increasing rate (increased in the manner of the linear function) from the start of welding until the power of the welding heat source reaches the predetermined power. However, the present disclosure is not limited to this example. For example, the power of the welding heat source may be increased by an increasing method (such as an exponential function) other than the linear function that provides an increase at the constant increasing rate from the start of welding until the power of the welding heat source reaches the predetermined power.

In the first to fifth embodiments described above, description is given of the example in which the welding head remains inclined at the predetermined angle (constant angle) that is equal to or larger than 30 degrees and equal to or smaller than 60 degrees over the range from the start of welding (start-side electromagnetic steel sheet) to the termination of welding (termination-side electromagnetic steel sheet). However, the present disclosure is not limited to this example. For example, the angle of the welding head may be changed during the welding.

In the first embodiment described above, description is given of the example in which the power of the welding heat source is set to zero in the state in which the distal end of the molten portion of the welding is located on the termination-side electromagnetic steel sheet. However, the present disclosure is not limited to this example. For example, as long as a necessary welding area can be secured, the power of the welding heat source may be set to zero in a state in which the distal end of the molten portion of the welding is located on an electromagnetic steel sheet in the vicinity of the termination-side electromagnetic steel sheet (for example, a second electromagnetic steel sheet from the termination-side electromagnetic steel sheet).

In the first to fifth embodiments described above, description is given of the example in which the inner side surface of the rotor core is welded. However, the present disclosure is not limited to this example. For example, the outer side surface of the rotor core may be welded.

In the first to fifth embodiments described above, description is given of the example in which the inner side surface of the rotor core is welded at eight portions. However, the present disclosure is not limited to this example. For example, the number of portions where the inner side surface of the rotor core is welded may be any other number than eight.

In the first and second embodiments described above, description is given of the example in which the plurality of stacked electromagnetic steel sheets are welded over the range from one end surface (end surface of the start-side electromagnetic steel sheet) to the other end surface (end surface of the termination-side electromagnetic steel sheet) of the rotor core (plurality of electromagnetic steel sheets) in the stacking direction. However, the present disclosure is not limited to this example. For example, the welding may be started from the end surface of the start-side electromagnetic steel sheet of the rotor core (plurality of electromagnetic steel sheets) and terminated at some midpoint among the plurality of electromagnetic steel sheets without performing the welding up to the end surface of the termination-side electromagnetic steel sheet.

In the first to fourth embodiments described above, description is given of the example in which the power of the welding heat source reaches the predetermined power before the distal end of the molten portion (keyhole) of the welding moves away from the start-side electromagnetic steel sheet arranged in the vicinity of the end of the welding start side out of the plurality of stacked electromagnetic steel sheets and the welding is performed up to the termination-side electromagnetic steel sheet while keeping the predetermined power. However, the present disclosure is not limited to this example. For example, the welding may be terminated before the power of the welding heat source reaches the predetermined power.

In the first to fifth embodiments described above, description is given of the example in which the molten portion passes through the plurality of electromagnetic steel sheets. However, the present disclosure is not limited to this example. For example, the plurality of electromagnetic steel sheets may be welded so that the molten portion passes only through a single electromagnetic steel sheet.

The invention claimed is:

1. A rotor manufacturing method, comprising:
stacking a plurality of electromagnetic steel sheets, each of the electromagnetic steel sheets including an electromagnetic steel sheet body and an insulating film that covers the electromagnetic steel sheet body; and
welding the plurality of electromagnetic steel sheets by moving a welding head relative to the plurality of electromagnetic steel sheets that are stacked in a state in which the welding head is inclined at a predetermined angle with respect to a stacking surface of the electromagnetic steel sheets so that a molten portion is formed across the electromagnetic steel sheet body and the insulating film of an electromagnetic steel sheet of the plurality of electromagnetic steel sheets from a first surface of the electromagnetic steel sheet to a second surface of the electromagnetic steel sheet opposite the first surface of the electromagnetic steel sheet,
wherein welding the plurality of electromagnetic steel sheets includes welding the plurality of electromagnetic steel sheets in the state in which the welding head is inclined at the predetermined angle with respect to the stacking surface of the electromagnetic steel sheets so that the molten portion is formed across the electromagnetic steel sheet body and the insulating film of the electromagnetic steel sheet of the plurality of electromagnetic steel sheets from the first surface of the electromagnetic steel sheet to the second surface of the electromagnetic steel sheet opposite the first surface of the electromagnetic steel sheet,
wherein welding the plurality of electromagnetic steel sheets includes welding the plurality of electromagnetic steel sheets by moving the welding head relative to the plurality of electromagnetic steel sheets in a state in which the welding head is inclined at the predetermined angle to a side of a moving direction of the welding head, and
wherein welding the plurality of electromagnetic steel sheets includes welding the plurality of electromagnetic steel sheets by moving the welding head relative to the plurality of electromagnetic steel sheets that are stacked while gradually increasing power of a welding heat source from a start of welding in the state in which the welding head is inclined at the predetermined angle to the side of the moving direction of the welding head.

2. The rotor manufacturing method according to claim 1, wherein
welding the plurality of electromagnetic steel sheets includes welding the plurality of electromagnetic steel sheets in the state in which the welding head is inclined at the predetermined angle with respect to the stacking surface of the electromagnetic steel sheets so that the molten portion is formed across the electromagnetic steel sheet body and the insulating film of each of the electromagnetic steel sheets.

3. The rotor manufacturing method according to claim 1, wherein welding the plurality of electromagnetic steel sheets includes continuously performing the welding from side surfaces of the plurality of electromagnetic steel sheets that are stacked to an end surface on an outer side in a rotational axis direction in one of the electromagnetic steel sheets arranged at an end of a welding termination side via a corner of the one of the electromagnetic steel sheets arranged at the end of the welding termination side in the state in which the welding head is inclined at the predetermined angle to the side of the moving direction of the welding head.

4. The rotor manufacturing method according to claim 1, wherein welding the plurality of electromagnetic steel sheets includes starting the welding from one end of the plurality of electromagnetic steel sheets that are stacked in a stacking direction, performing the welding up to a vicinity of a substantially central portion of the plurality of electromagnetic steel sheets that are stacked, then reversing the plurality of electromagnetic steel sheets that are stacked, starting the welding from the other end side of the plurality of reversed electromagnetic steel sheets in the stacking direction, and performing the welding up to the vicinity of the substantially central portion of the plurality of electromagnetic steel sheets that are stacked.

5. The rotor manufacturing method according to claim 1, wherein welding the plurality of electromagnetic steel sheets includes starting the welding from a vicinity of a substantially central portion of the plurality of electromagnetic steel sheets that are stacked in a stacking direction, performing the welding up to one end side of the plurality of electromagnetic steel sheets that are stacked, then reversing the plurality of electromagnetic steel sheets that are stacked, starting the welding from the vicinity of the substantially central portion of the plurality of reversed electromagnetic steel sheets in the stacking direction, and performing the welding up to the other end side of the plurality of electromagnetic steel sheets that are stacked.

6. The rotor manufacturing method according to claim 1, wherein the predetermined angle is equal to or larger than 30 degrees and equal to or smaller than 60 degrees.

7. The rotor manufacturing method according to claim 1, further comprising arranging an end plate at an end of the plurality of electromagnetic steel sheets that are stacked in the rotational axis direction, wherein welding the plurality of electromagnetic steel sheets includes welding the end plate and one of the electromagnetic steel sheets adjacent to the end plate so that a distal end of the molten portion is located on the end plate and the molten portion is formed across the end plate and the one of the electromagnetic steel sheets adjacent to the end plate.

* * * * *